(12) United States Patent
Richards

(10) Patent No.: US 9,970,296 B1
(45) Date of Patent: May 15, 2018

(54) FLUID DRIVEN TURBINE MOTOR AND POWERED TURBOCHARGER

(71) Applicant: James L. Richards, Broomfield, CO (US)

(72) Inventor: James L. Richards, Broomfield, CO (US)

( * ) Notice: Subject to any disclaimer, the term of this patent is extended or adjusted under 35 U.S.C. 154(b) by 0 days. days.

(21) Appl. No.: 15/631,827

(22) Filed: Jun. 23, 2017

Related U.S. Application Data

(62) Division of application No. 14/213,801, filed on Mar. 14, 2014, now abandoned.

(60) Provisional application No. 61/800,858, filed on Mar. 15, 2013.

(51) Int. Cl.
| | |
|---|---|
| *F04D 25/04* | (2006.01) |
| *F02B 37/10* | (2006.01) |
| *F01D 1/32* | (2006.01) |
| *F02B 33/40* | (2006.01) |
| *F02B 37/04* | (2006.01) |
| *F01D 1/18* | (2006.01) |

(52) U.S. Cl.
CPC ............... *F01D 1/32* (2013.01); *F01D 1/18* (2013.01); *F02B 33/40* (2013.01); *F02B 37/04* (2013.01); *F02B 37/10* (2013.01); *F04D 25/04* (2013.01); *F05D 2220/40* (2013.01); *F05D 2240/60* (2013.01)

(58) Field of Classification Search
CPC .......... F04D 25/04; F02B 37/10; F02B 37/14; F02B 39/08; F16C 2360/24; Y02T 10/144
USPC ................................................. 417/405–407
See application file for complete search history.

(56) References Cited

U.S. PATENT DOCUMENTS

| | | | | |
|---|---|---|---|---|
| 4,322,949 | A * | 4/1982 | Byrne | F02B 37/10 |
| | | | | 60/606 |
| 2003/0037546 | A1* | 2/2003 | Kapich | F01D 15/08 |
| | | | | 60/608 |

* cited by examiner

*Primary Examiner* — Peter J Bertheaud
(74) *Attorney, Agent, or Firm* — Karish & Bjorgum, PC

(57) ABSTRACT

A fluid motor is disclosed employed in a turbocharger to spin-up the turbocharger turbine independently of the existing exhaust gas pressure on the exhaust turbine wheel. A fluid turbine wheel is fixedly attached to the rotary mounted shaft of the turbocharger. Fixedly mounted nozzles directed at the fluid turbine wheel present fluid from a controlled source of pressurized fluid. A fixedly mounted collector receiving exhausted fluid from the fluid turbine wheel. The fluid is recycled from the collector to the controlled source of pressurized fluid and then back to the fixedly mounted. The fluid turbine wheel exhausts the fluid with residual energy to the collector. The controlled source of pressurized fluid includes a gear pump with an accumulator and a solenoid valve.

6 Claims, 5 Drawing Sheets

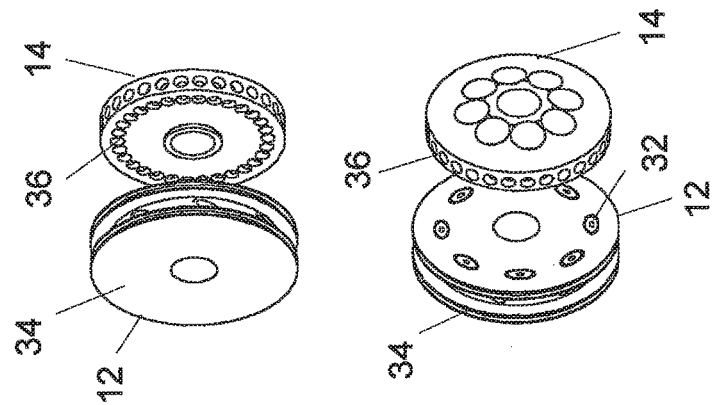
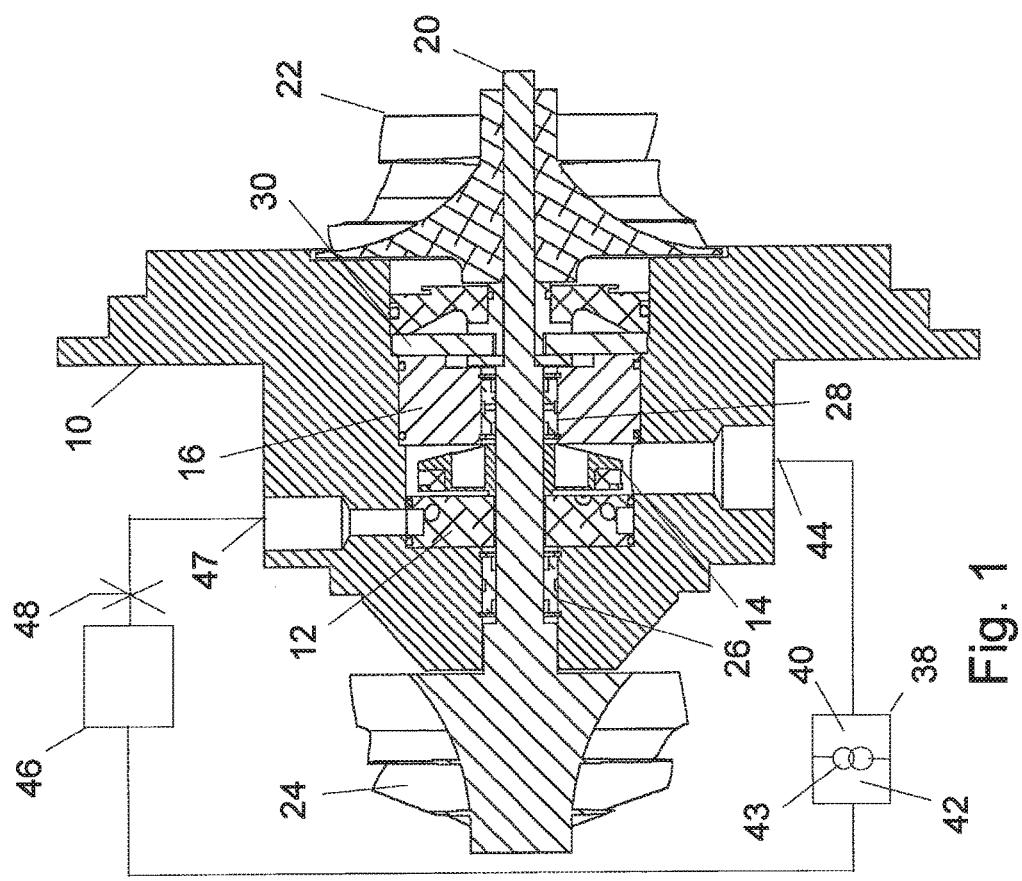
Fig. 2
Fig. 1

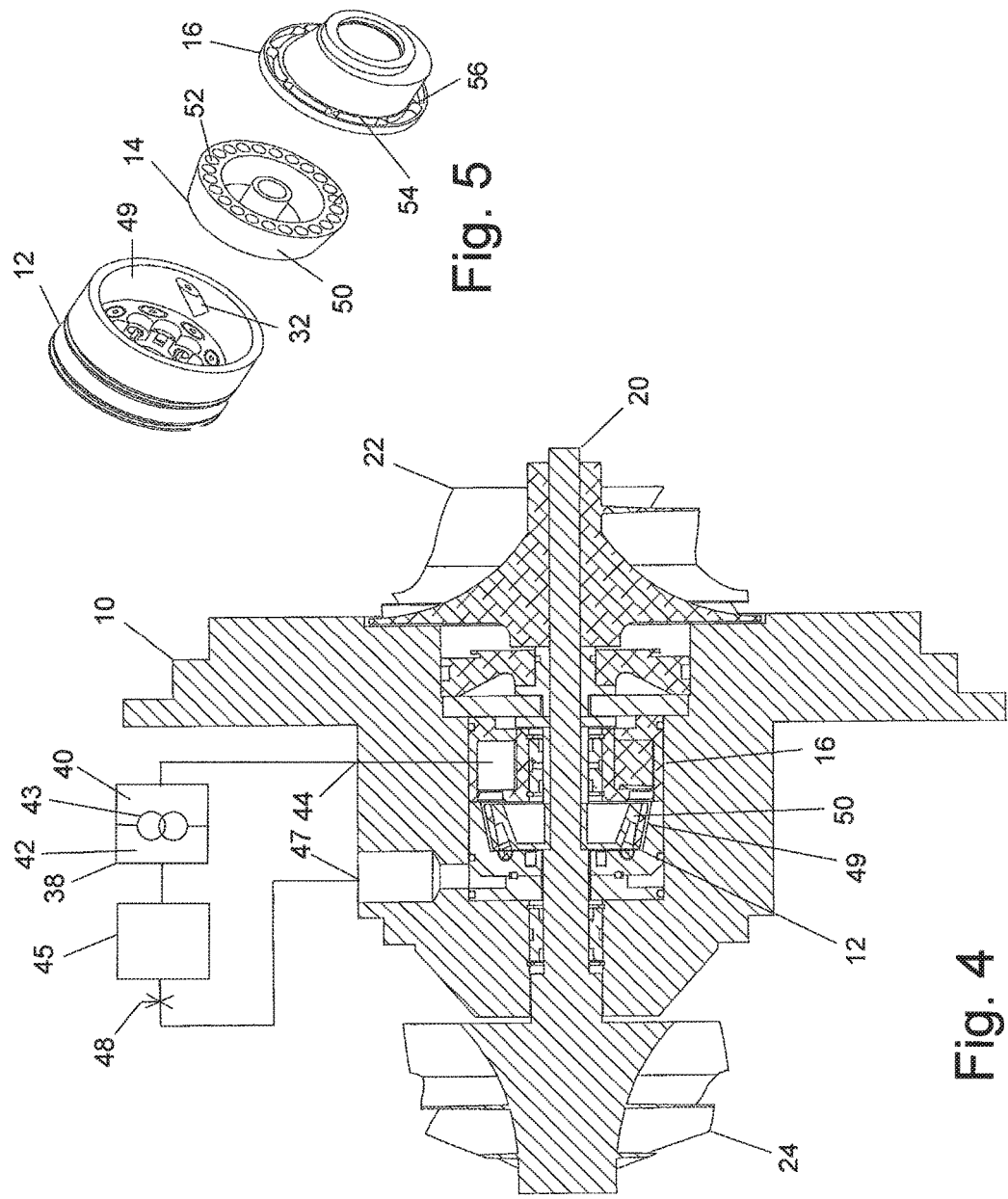

FLUID DRIVEN TURBINE MOTOR AND POWERED TURBOCHARGER

RELATED APPLICATIONS

This application is a divisional application of U.S. patent application Ser. No. 14/213,801, filed Mar. 14, 2014, which claims priority to U.S. Provisional Patent Application 61/800,858, filed Mar. 15, 2013, the disclosure of which is incorporated herein in its entirety.

BACKGROUND OF THE INVENTION

The field of the present invention is fluid driven turbines and applications thereof, including turbochargers.

A Pelton turbine was invented over a century ago. A high pressure nozzle or plurality of nozzles focuses a jet of fluid in a direction to optimize energy transfer into a wheel with cups or pockets. The energy from the velocity and mass of the fluid will be captured by the wheel and rotate with high efficiency (impulse turbine). After the fluid contacts the cups or pockets, the deflected and spent energy source falls into an open chamber and flows away with the help of gravity.

Optimally, this system leaves no energy in the fluid, after cup or pocket contact, to propel the fluid to be returned to its initial fluid source. Any effort to use the driven wheel to power a fluid return system to this date seems to not have been employed, possibly because the energy to drive a pump of conventional means would require energy from the system. On a conventional engine, in order for acceleration to take place, fuel is added creating a temporary "rich" condition, an imbalance of air-fuel ratio. This rich condition causes an increase (acceleration) in engine speed (rpm) which then causes more air to enter the induction system. In time, the system becomes balanced again in regards to air-fuel ratio. When a turbocharger is added to this scenario, turbo lag is encountered. Turbo lag increases the time of imbalance of the air-fuel ratio and causes an additional delay in acceleration; which is due to mechanical acceleration time where the turbocharger's rotating assembly needs to be accelerated to create more air flow. In both of these engine types there is a time period where excessive pollutants are made and a loss of power occurs when the air to fuel ratio is not optimum.

SUMMARY OF THE INVENTION

The present invention is directed to a fluid turbine coupled with a turbocharger or other air operated device. A high pressure nozzle or plurality of nozzles is focused onto a turbine wheel. In one form, a cone wheel has a small diameter end and a large diameter end and is connected to a rotating shaft. The cone has many passages on the small end of the cone that lead to an equal number on the large end. The size and shape of these passages have two functions: first to catch the fluid to extract as much rotational energy from the fluid velocity and mass as possible while capturing as much of the fluid as possible. A stationary slot very close to but not touching the spinning wheel captures the fluid to direct it under pressure to a common fluid return. A separate source of pressurized fluid may power the fluid turbine.

BRIEF DESCRIPTION OF THE DRAWINGS

FIG. 1 is a cross-sectional view of a turbocharger.

FIG. 2 is a left and right perspective view of fixedly mounted nozzles and a rotatably mounted turbine wheel.

FIG. 4 is a cross-sectional view of a turbocharger of a second embodiment.

FIG. 5 is an exploded assembly perspective view of the second embodiment of fixedly mounted nozzles, a rotatably mounted turbine wheel and a fixedly mounted collector.

DETAILED DESCRIPTION OF THE PREFERRED EMBODIMENT

Figure 3:
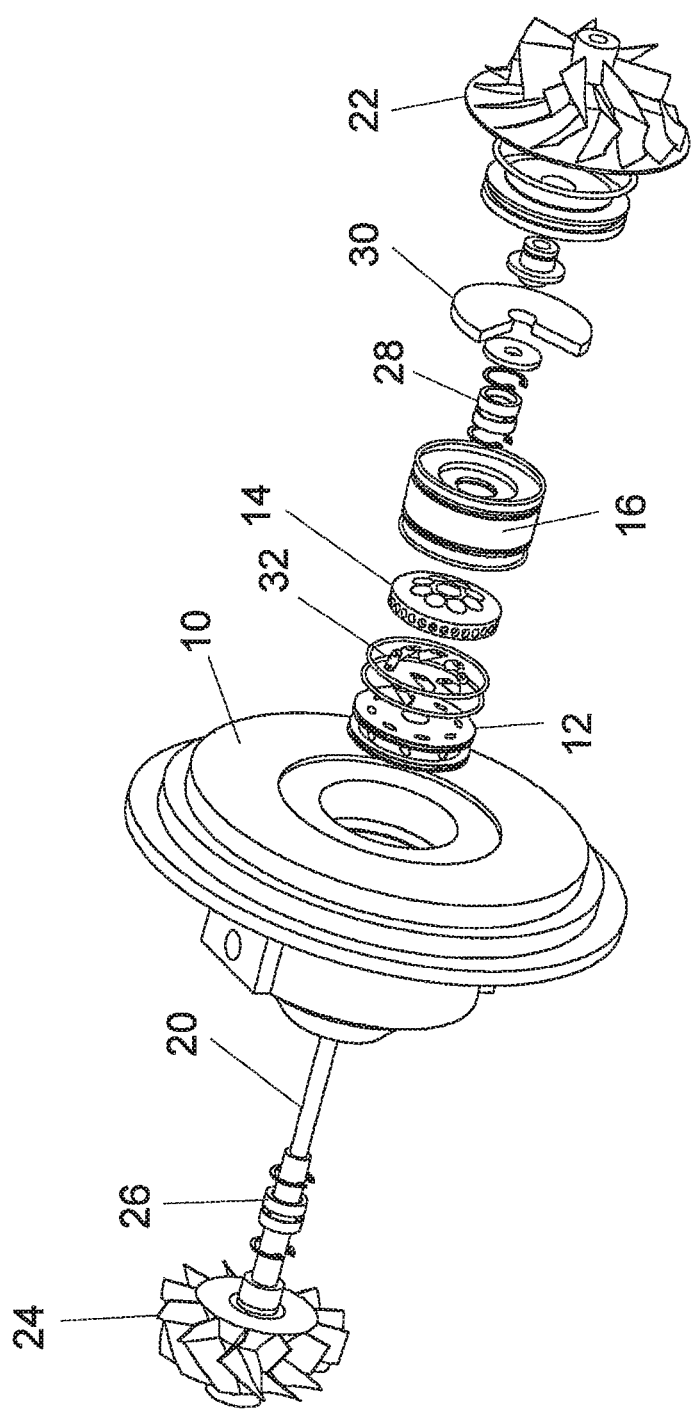
FIG. 3 is an exploded assembly perspective view of a turbocharger.

Turning in detail to the figures, a turbocharger is shown in cross section through the central shaft in FIG. 1. The turbocharger includes a center housing 10, an intake and fixedly mounted nozzles 12, a fluid turbine wheel 14, a fixedly mounted inner housing insert and collector 16, a rotary mounted shaft 20, an intake compressor wheel 22 and an exhaust turbine wheel 24. Bearings mounting the rotary mounted shaft 20 include a front bearing 26, a rear bearing 28 and a thrust bearing 30. The fluid turbine wheel 14, the intake compressor wheel 22 and the exhaust turbine wheel 24 are fixedly mounted to the mounting shaft 20. The fixedly mounted nozzles 12 are illustrated in a first embodiment in FIG. 2, has nozzle tubes 32 angularly positioned within a stationary wheel 34. The first fluid turbine wheel 14 is also illustrated in FIG. 2 as including turbine passages 36. In this first embodiment, the exhaust from the fluid turbine wheel 14 is conveyed to a pump 38 having a low pressure reservoir 40, a high pressure reservoir 42 and gear pump gear wheels 43 therebetween such as more fully disclosed in U.S. Pat. No. 6,000,513. The pump 38 is coupled with the return 44 from the turbocharger and with an accumulator 46. Pressure from an accumulator 46 to an inlet 47 to the nozzles 12 is controlled by an electric solenoid valve 48.

Figure 6:
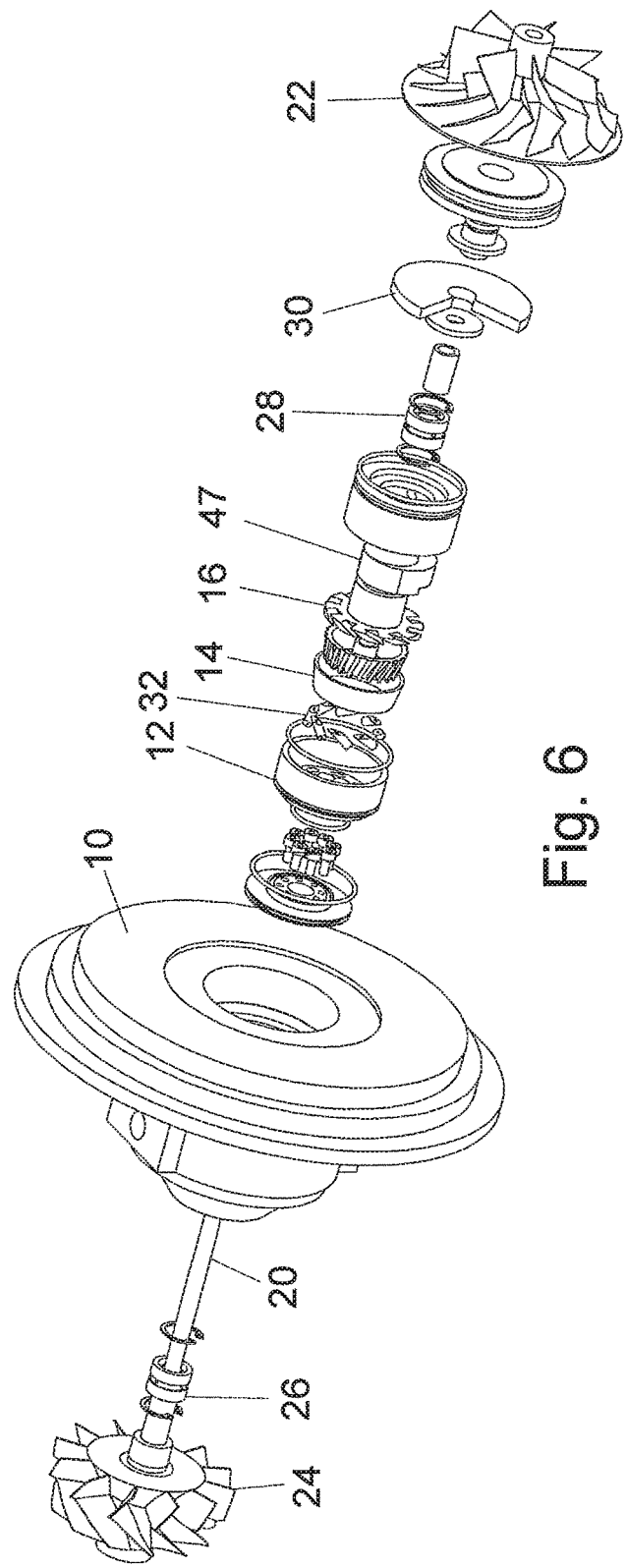
FIG. 6 is an exploded assembly perspective view of a turbocharger of the second embodiment.

A second embodiment is illustrated in FIGS. 4 through 6. The fixedly mounted nozzles 12 further include a shield 49 extending about a fluid turbine wheel 14 which, in this embodiment, is a cone shaped annular wheel 50 fixedly mounted to the rotary mounted shaft 20 with passages 52 extending therethrough. The fixedly mounted collector 16 includes a circular slot 54 with partitions 56 described further below.

It is believed that the capturing of fluid, in the passages 52 of the cone turbine 50, does not consume any relevant amount of energy; but having it now "on-board" (completely inside) the high rpm cone turbine 50, the fluid now has two energy values. One is speed caused by rotational RPM, the second is the acceleration of the fluid within the cone passages 52 from the small end through to the large diameter end from the centrifugal force generated by the spinning of the cone 50. The difference in diameters and the distance between each end of the cone 50 produces an angle in relation to the spinning axis of the cone 50. The angle, length, size, and shape of the passages 52 control the reenergizing of the fluid with centrifugal force. At the same time, the cross section of the passages 52 can be decreased from the small end to the large end to increase the acceleration of the fluid and qualify it for transfer.

As the reenergized fluid leaves the large rotating end of the turbine cone 50, it enters a fixedly mounted collector 16 having a circular slot 54 with partitions 56 across the circular slot 54. The fixedly mounted collector 16 is very close to, but not touching, the spinning cone 50. This circular slot 54 matches the passage outlets of the cone turbine 14 to precisely transfer the fluid from the rotating cone 50 to the slot 54 with the utmost efficiency. The very beginning of the stationary slot 54 has a small mid venturi shape causing the fluid to be accelerated slightly during transfer. The cross-sectional area of the stationary slot 54 just past the small venturi is maintained or slightly increased as the outer diameter is reduced as the passage moves axially away from the large end of the cone turbine 50. At this point the outlet becomes an outlet passage 36, usually a flexible hose or tubing that takes the fluid back to the supply source.

There are optional variations of the passages 52 in the rotating cone turbine 50 for tuning of RPM, torque, and efficiency of fluid return. The nozzle side of the passages 52 can have a cup shape at the jet contact point; this lets the fluid jet impact the cup perpendicular to flow to transfer the maximum amount of energy and to trap and contain the fluid within the passages 52. As centrifugal force and volume change accelerates the fluid, the passages 52 can turn back in the opposite direction relative to rotation forming a wedge shaped outlet opening. This wedge shaped outlet on the cone turbine 50 will act as a ramp to push the fluid across the opening between the cone turbine 50 and outlet nozzle housing 16 and the mid venturi in the outlet nozzle housing. The outlet nozzle housing can also have a series of high helix grooves to channel the fluid down to a single diameter outlet. These grooves will start as a fine pitch and change to a very course pitch in one or two revolutions. These high helix knife edges of the grooves will take the ejecting fluid and ram it down to a uniform cross section area within the nozzle housing outlet 36 and into an outlet hose or tube. The exact pitch, change in pitch rate, and placement of the helical grooves using turbine technology is advantageous to extract the rotational and centrifugal energies in the fluid and use the energy to push the fluid back into the supply reservoir. It is appropriate to understand that an outlet nozzle without the grooves still doubles the performance of the motor.

Once the fluid is in the cone passages 52 rotating at high speed, the centrifugal force along with the passage's inclined travel will enable the fluid to regain energy. Enough energy is put back into the fluid so that the fluid can exit the turbine chamber and assist in pushing itself back to the storage system.

The addition of a small diameter compressed air jet that releases high pressure air at very low volume and positioned on the same diameter as the fluid nozzles will add some unique benefits. The air jet is angled to enter the passages in the same angle as the fluid from the fluid nozzles 12. The air jet will supply very little force in turning the cone 50. Instead its volume will expand as it comes out and helps to push the liquid fluid through the turbine passages so the fluid will have a clear path of impact on the next revolution to efficiently transfer energy. A lot of energy will be lost if liquid remains in cups or pockets and incoming fluid impacts existing fluid instead of a solid turbine surface. The air also keeps the system cleaned out and running efficiently. This additional of an air jet creates enough pushing force to assist the fluid's return to the storage system even if the return line is over 20 feet long.

Applying this power source to a traditional turbocharger has some very unique and exclusive opportunities. With a traditional turbocharger, the exhaust of an internal combustion engine is directed through a spiral cone shaped housing with a slit on the inside diameter, opening to a refined turbine wheel. The exhaust gases (pressurized products of combustion) are pushed and accelerated through the cone shaped housing with diminishing cross-sectional area into the slit, energizing the exhaust turbine wheel in the process.

The exhaust turbine wheel drives a small diameter shaft a few inches long through a pair of bearings which is then connected to a compressor wheel. This exhaust driven assembly pumps pressurized air into an internal combustion engine, significantly increasing the engine's ability to make power.

There are several problems with a traditional turbocharger system. First, the engine needs to build exhaust pressure. This takes time and is called "turbo lag". In this era of environmental concern, turbo lag is an issue because it results in added pollutants. This pollution and lag results from additional fuel being injected first in a "fuel rich" condition in order to cause engine rpm and airflow to increase. Once the airflow has increased sufficiently and the turbo lag condition subsides, then the proper air to fuel ratios return and "clean" burning will resume.

The next issue is that turbo systems do not have a scope of operation that is perfect for all rpm conditions of an engine. There have been several methods put into production to minimize this but all are either very complex or inadequate. If the turbocharger system is sized for high rpm, the low rpm power band and turbo lag will be compromised in a negative manner. If the turbocharger system is sized for low rpm, RPM performance is compromised.

Another area of design importance is the mass of the rotating assembly because the turbocharger runs at RPM's of 100,000 and higher. Performance and turbo lag is greatly affected by increases in rotational mass. So, rotational mass is a serious concern and is preferably not increased by any significant amount. Current approaches to provide a supplemental drive to a turbocharger systems requires the packaging of one to two stages of gear ratios to multiply RPM from some power supply; or a massive direct drive system is utilized that adds an untenable mass weight to the rotating assembly. None of these approaches seem main stream reliable or cost effective.

The high RPM fluid driven turbine motor changes everything. When packaged into an existing turbocharger envelope, the fluid motor fits with very little modifications to the turbocharger. The fluid motor will package into existing turbocharger dimensions; the cone turbine is very small and almost insignificant mass is added to the rotating mass. There are only three main parts to this motor and two of these parts could be assimilated into the existing housing of a turbocharger system as additional features.

First the turbo only needs to be sized for high rpm. No compromise for lower rpm is needed for turbocharger selection. A source of high pressure fluid stored in an accumulator at high pressure (so the stored energy can be instantly used) with an on/off regeneration system. See U.S. Pat. No. 6,000,513, the disclosure of which is incorporated herein in its entirety by reference. This regeneration system has a transmission with a high pressure primary supply that would work superbly for driving the turbine motor, disclosing a gear pump, a low pressure reservoir to accommodate return fluid and a high pressure reservoir to feed the accumulator. An electric solenoid valve 48 with ECM control and an optional manual "power on demand" button would open and close the fluid supply from the high pressure accumulator to the nozzle or plurality of nozzles of the fluid motor. In essence, control the operation of the fluid motor assisted turbocharger system can be at will.

A few milliseconds after opening the valve 48, the cone turbine 50 will accelerate the rotating turbine assembly to an RPM that produces a significant pressurized air intake rush to the internal combustion engine ("Air First" system). The engine rpm will climb and fuel can be added at the proper lean, clean burn ratios to continue power generation per the specific requirement deemed by the ECM. At this point, the exhaust has gained sufficient energy to continue driving the rotating turbine assembly and the solenoid valve 48 is closed; no turbo lag will have existed.

This is a simple system that eliminates turbo lag and keeps the engine in an environmentally clean running situation at all times; yet this turbo assist system will also offer the additional "power on demand" feature. The solenoid valve 48 can be used to increase engine performance by opening the valve, at any RPM, and the assisted fluid drive power will be added to the exhaust gas power already driving the turbocharger at anytime.

Figure 7:
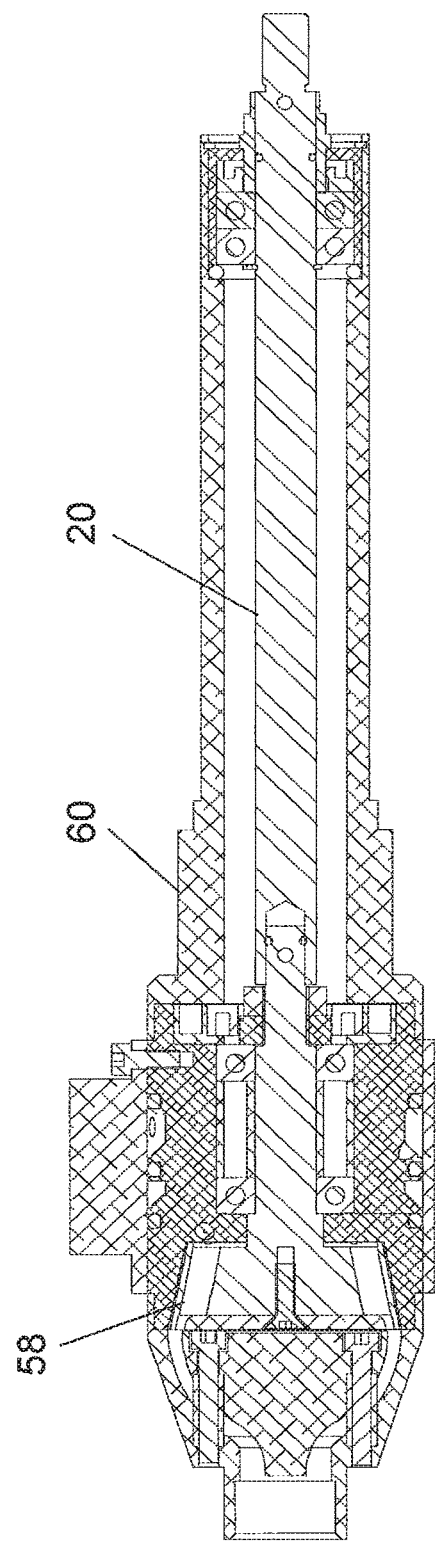
FIG. 7 is a cross-sectional view of a drive.

A different application is mounting the fluid motor 58 in a simple housing the same size and shape of a traditional air grinder or motor, producing a product that has superior features. One such drive 60 is illustrated in FIG. 7. First, the fluid motor is much more efficient; an air grinder or motor of the same power output consumes 30 to 35 cubic feet per minutes of air at 90 psi. A commercially available air compressor needed to generate this requirement is 10 to 15 horsepower. To run this air grinder or motor system you need the following: an air grinder or motor, a 10 to 15 HP motor, an air compressor, a check valve, a storage tank, an air cooled radiator, a large belt driven pulley with a fan cast in, and other small pulleys and belts. The fluid motor in the same package size and power output requires a 5 HP pump, a radiator with a 314 HP cooling fan, and a 314 HP circulation pump for the radiator. The total power for the fluid grinder is 6½ HP. It is possible to design a package with the pump, radiator, fan, and circulation pump into one module that is powered and driven with one 6.5 HP motor; which can be sold as an assembly like air compressors are sold now. The fluid grinder is 1.5-2.3 times more efficient to operate. A fluid grinder motor may be driven by an oil product, which is a natural lubricant and the fluid motor has only one moving part with no wearing surfaces. Therefore, life expectancy is years and years. The fluid motor is always a positive start motor. Air motors sometimes have a coast down scenario where the grooves collapse into the rotor and get stuck. When air is reapplied, the air will simply bypass the motor; and the grinder will not run. This faulty starting feature of air motors is not acceptable in automation equipment.

Thus, a fluid motor with recirculation and applications thereof have been presented. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A fluid motor comprising
    a shaft rotatably mounted about an axis;
    a turbine wheel fixed to the shaft, the turbine wheel including two sides, a periphery between the two sides and passages extending between the two sides, each passage having an inlet at a first of the two sides and an outlet at a second of the two sides, the passages of the turbine wheel being closed passages between the inlets and the outlets, the inlets being closer to the axis than the outlets;
    fixedly mounted nozzles directed at the inlets;
    a fixedly mounted collector, the outlets being in communication with the fixedly mounted collector, the fixedly mounted collector including a circular slot aligned with the outlets of the passages, the circular slot including a venturi;
    a controlled source of pressurized incompressible fluid in communication with the fixedly mounted nozzles and including a fluid intake in communication with the fixedly mounted collector.

2. The fluid motor of claim 1, the controlled source of pressurized fluid including a fluid circuit having a pump in fluid communication between the fluid intake and the fixedly mounted nozzles, an accumulator in fluid communication between the pump and the fixedly mounted nozzles and a valve in fluid communication between the accumulator and the fixedly mounted nozzles.

3. The fluid motor of claim 1, the periphery of the turbine wheel is a truncated conical surface.

4. The fluid motor of claim 1, the passages being of decreasing cross section between the inlets and the outlets, respectively.

5. The fluid motor of claim 1, the passages being curved to present a surface with a region of perpendicularity to the fixed nozzles.

6. A turbocharger comprising
    the fluid motor of claim 1;
    an exhaust turbine wheel;
    an intake compressor wheel, the exhaust turbine wheel, the intake compressor wheel and the fluid turbine wheel being fixed to the rotary mounted shaft.

* * * * *